United States Patent [19]

Nishioka

[11] Patent Number: 4,730,396

[45] Date of Patent: Mar. 15, 1988

[54] ALIGNING MECHANISM FOR POWER HAND SAWS

[76] Inventor: Jim Z. Nishioka, 1268 Hemlock NW., Salem, Oreg. 97304

[21] Appl. No.: 844,156

[22] Filed: Mar. 26, 1986

[51] Int. Cl.⁴ ............................................. B23D 47/02
[52] U.S. Cl. ........................................ 30/371; 30/391
[58] Field of Search .................................. 30/388–391, 30/371, 373, 374

[56] References Cited

U.S. PATENT DOCUMENTS

| | | |
|---|---|---|
| 2,942,633 | 6/1960 | King . |
| 2,973,576 | 3/1961 | Hentke ................................. 30/371 |
| 3,045,724 | 7/1962 | Mitchell . |
| 3,757,628 | 9/1973 | Camacho ............................. 83/743 |
| 3,903,774 | 9/1975 | Stinson ............................. 83/471.2 |
| 4,125,942 | 11/1978 | Horner ............................. 33/76 R |
| 4,202,233 | 5/1980 | Larson ................................. 83/745 |
| 4,335,512 | 6/1982 | Sheps ................................. 30/376 |
| 4,453,312 | 6/1984 | Nishioka ............................. 30/372 |
| 4,483,071 | 11/1984 | Tekolste ............................. 30/388 |

*Primary Examiner*—Douglas D. Watts

[57] ABSTRACT

An aligning mechanism for power hand saws in the preferred structure of this disclosure is connected to a saw. The saw comprises a motor, a handle, a blade, a base, and a switch to activate the motor and the blade. The mechanism includes an aligning device for aligning the saw. The aligning device and the saw move forwardly together and in unison during cutting movements of the saw. Such aligning device has an operable position and an non-operable position, such operable position being for positioning at least a portion of the aligning device below a saw base for engaging a work piece and the non-operable position being for positioning the aligning device up and away from a work piece. In one embodiment of the invention, an electrical solenoid is employed to move the aligning device, such solenoid being connected to the saw switch. Another embodiment of the invention employs a manually activated aligning device. Still another embodiment employs the forward movement of the saw and an engagement of the aligning device to a work piece to activate the aligning device. The aligning device can be selectively positioned for angular alignment of the saw.

12 Claims, 10 Drawing Figures

ALIGNING MECHANISM FOR POWER HAND SAWS

BACKGROUND OF THE INVENTION

This invention relates to new and useful improvements in aligning mechanisms for power hand saws.

Mechanisms for aligning power hand saws are useful in providing accuracy, efficiency and convenience. Previous devices have been employed for such guiding but have been complex, bulky and costly to manufacture.

SUMMARY OF THE INVENTION

According to the present invention and forming primary objectives thereof, an aligning mechanism for power hand saws is provided having a novel structural arrangement of an aligning device and activating device.

An important feature of the present invention is that the aligning device and the saw move forwardly together and in unison during cutting movements of the saw. Previous structures employ aligning devices which remain stationary with a work piece, such structures being found in applicant's patent, Nishioka, Ser. No. 453,312, June 12, 1984; Camacho, U.S. Pat. No. 3,757,628, Sept. 11, 1973; and Mitchell, U.S. Pat. No. 3,045,724, July 24, 1962. These structures guide the saw during the forward cutting movement of the saw. The applicant's instant mechanism aligns the saw to the work piece for the cutting movement, however, does not actually guide the saw during such movement.

Another advantage of the present invention is that the operator need not grasp the aligning device.

Still another advantage is that in one embodiment of the invention a solenoid automatically retracts the aligning device when the saw is turned on.

Still another advantage is that in one embodiment of the invention the aligning device remains retracted until the operator activates a link which moves a portion of the aligning device to a position below the saw base to engage a work piece.

Still another advantage is that in one embodiment of the invention the aligning device is activated by the forward movement of the saw and the engagement of the aligning device with the work piece.

Still another advantage is that the mechanism provides for selectively positioning the aligning device for angular alignment of the saw.

The invention will be better understood and additional objects and advantages thereof will become apparent from the following description taken in connection with the accompanying drawings of the preferred structure of the invention.

DETAILED DESCRIPTION OF PREFERRED EMBODIMENTS

Figure 1:
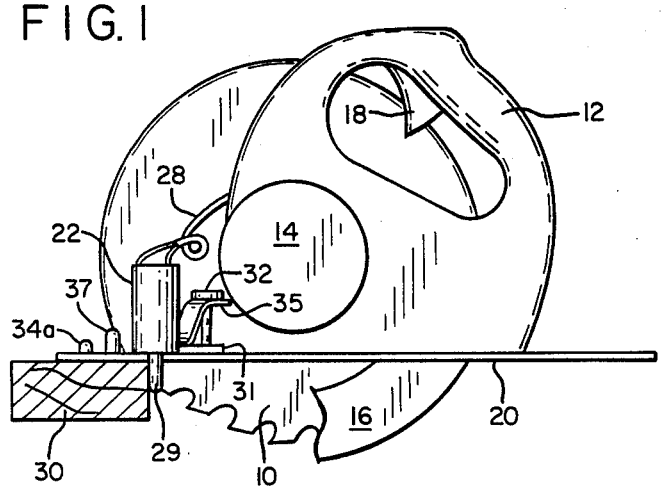
FIG. 1 is a side elevational view of a saw and a first form of the aligning mechanism embodying principles of the present invention.
Figure 2:
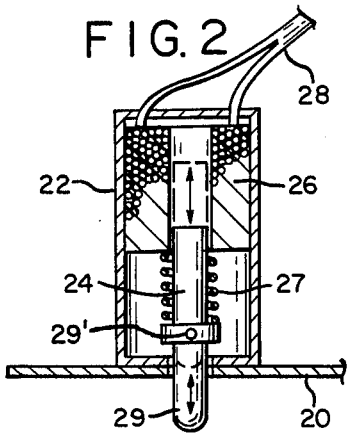
FIG. 2 is an enlarged fragmentary elevational sectional view of the invention.
Figure 3:
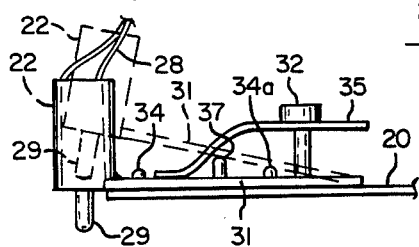
FIG. 3 is an enlarged fragmentary elevational view of the invention.
Figure 4:
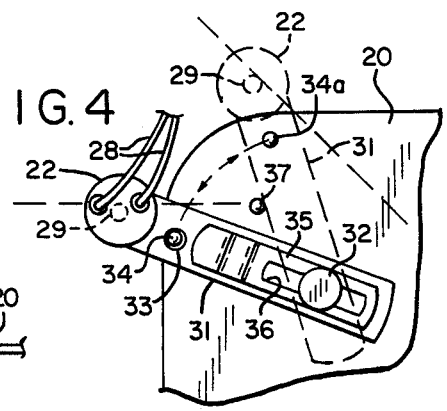
FIG. 4 is a top plan view of the invention shown in FIG. 3.

With reference first to FIG. 1, the present invention is arranged for use with a conventional portable power hand saw having a blade 10, a handle 12, a motor 14, a blade guard 16, a switch 18, and a base 20.

A first form of the aligning mechanism is shown in FIGS. 1-5 and includes an electromagnetic device or solenoid 22 which includes a core 24, a coil 26 and a spring 27. The mechanism also includes wiring 28 which connects the solenoid to the saw switch and a shaft or aligning device 29 for butting against a work piece 30. A pin 29' connects the aligning device to the core. The aligning device in an operable position extends below the bottom of the saw base to engage the work piece. The spring urges the aligning device to maintain its operable position. Furthermore, such aligning device in a rest condition extends below the saw base. A shaft is shown as the aligning device, however, other devices such as a plate may be employed to accomplish the same function. The solenoid is of a conventional puller type, and preferrably, with a laminated core.

An arm 31 is pivotably and loosely connected to an anchor stud 32 and such arm includes a bore 33 which receives a pin 34. A flat spring 35 is connected to the arm and such spring includes an elongated slot 36 which receives the anchor stud. The spring exerts a downward tension on the arm. The slot allows the spring to slide against the stud as the arm is raised. Other spring elements, such as a coil compression spring placed on the anchor stud above the arm, may be employed to accomplish the same function. The solenoid is supported on the outer end of the arm and such solenoid can be selectively positioned by lifting the solenoid and the arm so that the latter clears the pin 34. This is shown by broken lines in FIG. 3. The solenoid and the arm can now be pivoted so that the bore 33 will receive a second pin 32a, thus allowing selective positioning of the aligning device to accommodate angular alignment of the saw. Such selective positioning is shown by broken lines in FIG. 4.

Figure 5:
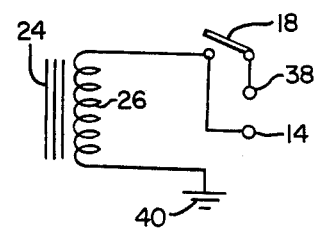
FIG. 5 is a diagram of the electrical circuit of the embodiment of FIG. 1.

FIG. 5 is a diagram of the electrical circuit of the mechanism. The circuit includes an electrical power source 38 and a ground 40.

To operate this embodiment, the operator butts the aligning device and the saw blade against the work piece. This aligns the saw to the work piece. The operator can back off the saw slightly from the work piece and then turn on the saw. This will activate the solenoid which in turn will pull the core and the attached aligning device upwardly to a retracted or non-operable position above the bottom of the saw base, such position allowing the operator to move the saw forward and make his cut. The switch will simultaneously activate the motor and the solenoid.

The alignment of the saw to the work piece is a very important feature since the initial cut will be made with the saw in correct alignment with the work piece and such alignment will reduce the amount of correction needed during the cutting movements of the saw.

Another important advantage of the present invention is that alignment is fast and easily accomplished since the operator can feel when the saw blade and the aligning device contact the work piece.

The aligning device moves forwardly together and in unison with the saw during cutting motions of the latter. With previous structures the aligning device remains with the work piece and thus requires an elongated and cumbersome structure to accommodate the difference in movement between the saw and the work piece. With the present invention the aligning device moves forwardly with the saw, therefore, the need for such elongated structure is eliminated. Furthermore, the elimination of the elongated structure provides a more compact profile for the saw.

When the arm and solenoid are raised and then rested on a pin 37, the aligning device will remain above the bottom of the saw base in a retracted or non-operable position. This is due to the fact that the arm has no receiving bore for such pin so the arm cannot drop down to an operable position. This allows the operator an option of using the saw without employing the aligning mechanism. This is accomplished without removing any parts from the saw.

Figure 6:
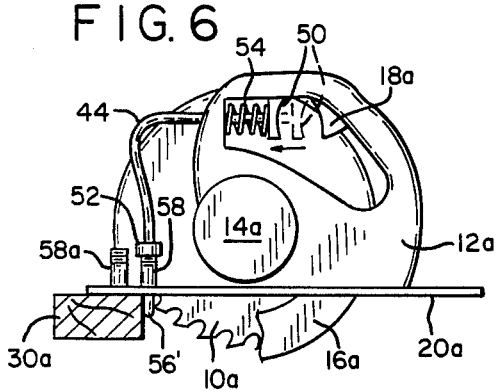
FIG. 6 is a side elevational view of another form of the invention embodying principles of the present invention.
Figure 7:
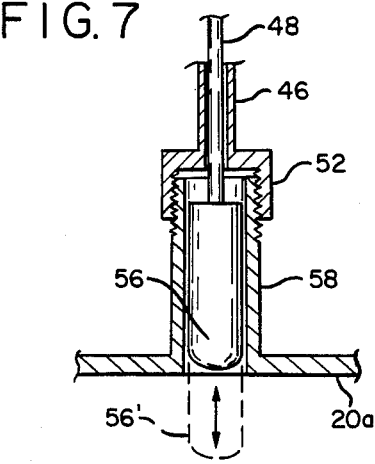
FIG. 7 is an enlarged fragmentary side elevational sectional view of the aligning device of the embodiment shown in FIG. 6.

Referring to FIGS. 6-7, another embodiment of the invention includes a flexible cable or link 44 comprising an outer cable housing 46, a cable 48, a cable end or button 50, and a coupler with inner threads 52. The mechanism also includes a spring or resilient element 54, a shaft or aligning device 56 and threaded hollow studs 58 and 58a. The studs provide a means to selectively position the aligning device for angular alignment of the saw. The flexible cable is shown, however, other forms of a link such as a fluid or hydraulic line may be employed to accomplish the same function. A button is shown on the end of the cable, however, other devices such as a lever may be employed to perform the same function.

To operate this embodiment of the aligning mechanism the operator depresses the cable button against the resistance of the spring which activates the cable and the aligning device so that such aligning device will be moved to an operable position below the bottom of a saw base 20a to engage a work piece 30a as seen in FIG. 6. The normal resting position of the switch is indicated by broken lines. The resting position of the aligning device is seen in FIG. 7 with the operable position indicated by broken lines 56'. When the saw is properly aligned the operator releases the button and makes his cut. The spring will urge the aligning device to return to a retracted or non-operable position above the bottom of the saw base. Such retracted or non-operable position is the rest condition of this embodiment of the aligning device. This aligning device, similar to the first embodiment, moves forwardly together with the saw during cutting motions of the latter.

With this embodiment of the invention, the operator must activate the mechanism to engage the work piece. If desired, the saw can be operated without activating the mechanism.

Figure 8:
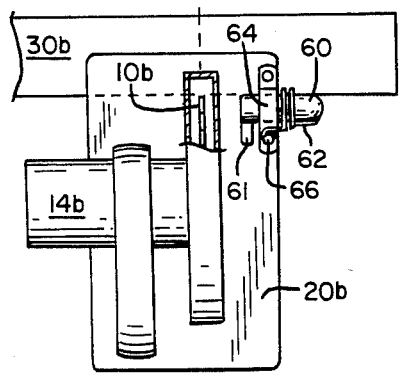
FIG. 8 is a top plan view of still another form of the invention embodying principles of the present invention, a portion of a saw guard being broken away to show a saw blade.
Figure 9:
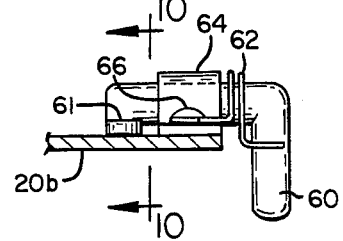
FIG. 9 is an enlarged rear elevational sectional view of the aligning device shown in FIG. 8.
Figure 10:
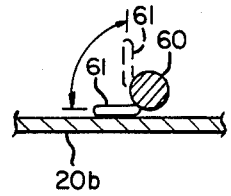
FIG. 10 is a vertical sectional view taken on line 10—10 of FIG. 9.

Referring to FIGS. 8-10, still another embodiment of the present invention comprises an aligning device 60, a spring or resilient element 62, a bracket 64 and studs 66. Such studs secure the bracket and the end of the spring to a saw base 20b. Extension 61 limits the pivoting movement of the aligning device and positions it for engagement with a work piece 30b. The spring urges the aligning device to maintain an operable positon below the saw base. In FIG. 8 a portion of a blade guard 16b has been broken away to show a portion of a saw blade 10b. The aligning device includes a pivotable shaft portion which extends transversely to a cutting direction of the saw.

To operate this embodiment of the aligning mechanism, the operator simply moves the saw forwardly to engage both the saw blade and the aligning device to the work piece. The mechanism can be aligned by feel or aligned visually. The forwardly movement of the saw will cause the aligning device to pivot in a rearwardly direction and retract from its operable position below the bottom of the saw base to a non-operable position above the bottom of the saw base. When the cut is completed and the saw is lifted from the workpiece, the spring will urge the aligning device to return to its operable position below the bottom of the saw base. In a rest condition of the mechanism the aligning device extends below the saw base.

Similar to the two previous embodiments of the disclosure, this aligning device moves forwardly together with the saw during cutting motions of the latter.

Various modifications of the present invention are possible under the scope of the present invention. One such modification is to employ a conventional pusher type solenoid in place of the present conventional puller type solenoid 22 shown in FIG. 1. The modified mechanism could employ a push type electrical switch located on the saw handle and positoned in a manner similar to the cable end button 50 shown in FIG. 6, such electrical swithc being activated with a forward pushing motion. The switch would be connected to the power source and the solenoid. A spring would urge the aligning device to a non-operative position above the bottom of the base of the saw. To operate this modification the operator would push the electrical switch forwardly which would activate the pusher solenoid which in turn would push the aligning device below the bottom of the saw base. The operator would then align the saw in a procedure similar to that employed with the embodiment shown in FIG. 1. When the alignment is accomplished the operator releases the switch which will allow the spring to retract the aligning device so that the saw can move forward to make its cut.

Another modification of the present invention is that the solenoid 22 of FIG. 1 can be secured to the base 20 without employing an angulation adjusting feature.

The mechanism is suitable for manufacture as an after-market attachment or can be manufactured as a part of the saw.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described by invention, I claim:

1. A mechanism for aligning a portable power saw to a work piece, the saw being of a type having a motor, a handle, a blade, a base, and a switch to activate the motor and the blade, said mechanism comprising aligning means for butting against a work piece and means for connecting said aligning means to a saw, said aligning means for aligning a saw to a work piece for cutting movements, said aligning means having an operable position and a non-operable position, said operable position of said aligning means being for positioning at least a portion of said aligning means below a saw base for engaging a work piece and said non-operable position of said aligning means being for positioning said aligning means up and away from a work piece, said aligning means moving forwardly together with a saw during a cutting movement of the latter, said mechanism also including means to cause said aligning means to move from said operable position below a saw base to said non-operable position away from a work piece during operation of said mechanism.

2. The mechanism of claim 1 wherein said mechanism includes a solenoid.

3. The mechanism of claim 1 wherein said mechanism includes means to connect a saw motor and said aligning means for simultaneously activating both.

4. The mechanism of claim 1 wherein said aligning means includes a downwardly extending shaft for engaging a work piece, said shaft extending downwardly through a base of a saw.

5. The mechanism of claim 1 wherein said mechanism includes a solenoid, said mechanism also including means for allowing selective positioning of said solenoid and said aligning means.

6. The mechanism of claim 1 wherein said mechanism includes an anchor stud and a pivotable arm, said anchor stud being secured to a saw base, said pivotable arm being pivotably connected to said anchor stud, said mechanism also including a spring means connected to said pivotable arm for exerting a downward tension on the latter.

7. The mechanism of claim 1 wherein said mechanism includes a link connected to a saw handle and said aligning means for activating the latter, said mechanism also including means to connect said link to a saw handle.

8. The mechanism of claim 1 wherein said aligning means is pivotable in a rearwardly direction so that an initial forwardly cutting movement of a saw will cause a pivoting movement of said aligning means.

9. The mechanism of claim 1 wherein said aligning means, when engaged to a work piece, is moved from said operable position to said non-operable position by a forward movement of a saw.

10. A mechanism for aligning a portable power saw to a work piece, the saw being of a type having a motor, a handle, a blade, a base, and a switch to activate the motor and the blade, said mechanism comprising aligning means for butting against a work piece and means for connecting said aligning means to a saw, said aligning means for aligning a saw to a work piece for cutting movements, said aligning means having an operable position and a non-operable position, said operable position of said aligning means being for positioning at least a portion of said aligning means below a saw base for engaging a work piece and said non-operable position of said aligning means being for positioning said aligning means up and away from a work piece, said aligning means moving forwardly together with a saw during a cutting movement of the latter, said mechanism also including means to connect said aligning means to electrical means for providing power to move said aligning means.

11. A mechanism for aligning a portable power saw to a work piece, the saw being of a type having a motor, a handle, a blade, a base, and a switch to activate the motor and the blade, said mechanism comprising aligning means for butting against a work piece and means for connecting said aligning means to a saw, said aligning means for aligning a saw to a work piece for cutting movements, said aligning means having an operable position and a non-operable position, said operable position of said aligning means being for positioning at least a portion of said aligning means below a saw base for engaging a work piece and said non-operable position of said aligning means being for positioning said aligning means up and away from a work piece, said aligning means moving forwardly together with a saw during a cutting movement of the latter, said mechanism also including electromagnetic means connected to said aligning means, said electromagnetic means moves said aligning means from said operative position below a saw base to said non-operative position above a saw base.

12. A mechanism for aligning a portable power saw to a work piece, the saw being of a type having a motor, a handle, a blade, a base, and a switch to activate the motor and the blade, said mechanism comprising aligning means for butting against a work piece and means for connecting said aligning means to a saw, said aligning means for aligning a saw to a work piece for cutting movements, said aligning means having an operable position and a non-operable position, said operable position of said aligning means being for positioning at least a portion of said aligning means below a saw base for engaging a work piece and said non-operable position of said aligning means being for positioning said aligning means up and away from a work piece, said aligning means moving forwardly together with a saw during a cutting movement of the latter, said aligning means being positioned in said operable position below a saw base when said mechanism is in a rest condition and said aligning means being positioned in said non-operable position above a saw base during a cutting movement of a saw.

* * * * *